(12) United States Patent
Tokunaga et al.

(10) Patent No.: US 7,978,426 B2
(45) Date of Patent: Jul. 12, 2011

(54) PRISM AND OPTICAL DEVICE

(75) Inventors: Tomokazu Tokunaga, Hyogo (JP);
Eiichi Nagaoka, Hyogo (JP); Minoru Onoda, Osaka (JP)

(73) Assignee: Panasonic Corporation, Osaka (JP)

( * ) Notice: Subject to any disclaimer, the term of this patent is extended or adjusted under 35 U.S.C. 154(b) by 301 days.

(21) Appl. No.: 12/280,635

(22) PCT Filed: Mar. 7, 2007

(86) PCT No.: PCT/JP2007/054439
§ 371 (c)(1),
(2), (4) Date: Aug. 25, 2008

(87) PCT Pub. No.: WO2007/111101
PCT Pub. Date: Oct. 4, 2007

(65) Prior Publication Data
US 2009/0002857 A1    Jan. 1, 2009

(30) Foreign Application Priority Data

Mar. 24, 2006 (JP) ................................. 2006-083563

(51) Int. Cl.
*G02B 5/04* (2006.01)
(52) U.S. Cl. ........................................................ 359/834
(58) Field of Classification Search .................. 359/833, 359/834, 835, 836
See application file for complete search history.

(56) References Cited

U.S. PATENT DOCUMENTS

| | | | | |
|---|---|---|---|---|
| 5,946,147 A | * | 8/1999 | Tanaka et al. | 359/831 |
| 2002/0001145 A1 | * | 1/2002 | Tochigi | 359/831 |
| 2002/0030901 A1 | * | 3/2002 | Kobayashi et al. | 359/831 |

FOREIGN PATENT DOCUMENTS

| | | |
|---|---|---|
| JP | 2004-354869 | 12/2004 |
| JP | 2005-121928 | 5/2005 |
| WO | WO 2004/107010 A1 | 12/2004 |

* cited by examiner

*Primary Examiner* — Alessandro Amari
(74) *Attorney, Agent, or Firm* — McDermott Will & Emery LLP

(57) ABSTRACT

A prism (10) is in the form of a polygonal prism and has a first optical surface (11), a second optical surface (12) and a third optical surface (13) formed on different surfaces of the prism. A light entrance region (11a) is provided at the center of the first optical surface (11), a light exit region (12a) is provided at the center of the second optical surface (12) and a substantially flat light reflecting region (13a) is provided at the center of the third optical surface (13). Suppose that there is a virtual surface between the light reflecting region (13a) and the first optical surface (11), the virtual surface is positioned more inward in the prism than a peripheral region of the third optical surface (13) extending from the light reflecting region (13a) to an edge (14) between the third optical surface (13) and the first optical surface (11).

9 Claims, 4 Drawing Sheets

PRISM AND OPTICAL DEVICE

RELATED APPLICATIONS

This application is the U.S. National Phase under 35 U.S.C. §371 of International Application No. PCT/JP2007/054439, filed on Mar. 7, 2007, which in turn claims the benefit of Japanese Application No. 2006-083563, filed on Mar. 24, 2006, the disclosures of which Applications are incorporated by reference herein.

TECHNICAL FIELD

The present invention relates to prisms and optical devices. In particular, it relates to a polygonal prism and an optical device including the prism.

BACKGROUND ART

In recent years, small-size imaging devices such as digital still cameras and digital video cameras have widely been spread as home imaging devices. Further improvement in convenience, in particular further size reduction, has been demanded for these small-size imaging devices. To meet the demand, attempts have been made to reduce size and thickness of optical elements installed in the small-size imaging devices. In these days, use of folded optical systems in the small-sized imaging devices has been proposed.

For example, Patent Literature 1 discloses an imaging device including a folded optical system. The imaging device includes an optical system having 5 lens groups. A first lens group which is the closest to the subject constitutes the folded optical system. Specifically, the first lens group consists of a first lens, a prism and a second lens. Light incident on the imaging device is bent substantially vertically by the prism and then enters the second lens. The optical system in the thus-configured imaging device is reduced in thickness because the lens moves in the direction of an optical axis of the second lens for the zooming.
[Patent Literature 1] Published Japanese Patent Application No. 2004-354869

DISCLOSURE OF THE INVENTION

Problem that the Invention is to Solve

The size reduction of the imaging devices has been demanded as described above. At the same time, the imaging devices have been required to be multifunctional. For this reason, there is a tendency to increase the aspect ratio of an imaging element from 4:3 to 16:9. From this aspect, an attempt has been made to install the 16:9 imaging element into the small-size imaging device.

When a polygonal prism is used and the aspect ratio of the imaging element is changed from 4:3 to 16:9, the height of the prism is increased to cope with the lateral size increase of the imaging element. Further, sides of a bottom surface of the prism are made longer to address the vertical size increase of the imaging element. However, when the height and the length of the sides of the bottom surface of the prism are increased, the size of the prism is increased. As a result, the size of the imaging device is inevitably increased.

When the length of the sides of the bottom surface of the prism is increased, optical surfaces of the prism are also increased in size. Therefore, the optical system has to be reconstructed.

The prism is also used in other devices than the imaging devices, such as illuminating devices. For the illuminating devices, improvement in illumination intensity is also required in addition to the size reduction of the device.

The present invention has been achieved in view of the foregoing aspect. An object of the invention is to provide a prism which permits functional improvement and size reduction of an optical device and an optical device including the prism.

Means of Solving the Problem

The prism according to the present invention is a polygonal prism having a first optical surface, a second optical surface and a third optical surface formed on different surfaces of the prism. To be more specific, a light entrance region is provided at the center of the first optical surface, a light exit region is provided at the center of the second optical surface and a substantially flat light reflecting region is provided at the center of the third optical surface. Suppose that there is a virtual surface between the light reflecting region and the first optical surface, the virtual surface is positioned more inward in the prism than a peripheral region of the third optical surface extending from the light reflecting region to an edge between the third optical surface and the first optical surface.

Regarding the above-described prism, a line of intersection of the virtual surface and the first optical surface is positioned more inward in the prism than the edge. Therefore, the first optical surface becomes larger than a first optical surface of a conventional prism.

An optical device of the present invention includes an optical system having a polygonal prism having a first optical surface, a second optical surface and a third optical surface formed on different surfaces of the prism. To be more specific, a light entrance region is provided at the center of the first optical surface, a light exit region is provided at the center of the second optical surface, a substantially flat light reflecting region is provided at the center of the third optical surface. Suppose that there is a virtual surface between the light reflecting region and the first optical surface, the virtual surface is positioned more inward in the prism than a peripheral region extending from the light reflecting region to an edge between the third optical surface and the first optical surface.

EFFECT OF THE INVENTION

The present invention makes it possible to achieve functional improvement and size reduction of the optical device.

EXPLANATION OF REFERENCE NUMERALS

10, 20 Prism
11 First optical surface
11*a* Light entrance region or light exit region
12 Second optical surface
12*a* Light exit region or light entrance region
13 Third optical surface
13*a* Light reflecting region
14, 24 Edge
15, 25 Line of intersection
26 Edge (second edge)
27 Line of intersection (second line of intersection)
100 Imaging device (Optical device)
200 Illuminating device (Optical device)

BEST MODE FOR CARRYING OUT THE INVENTION

Hereinafter, embodiments of the present invention will be explained in detail with reference to the drawings. It may be understood however that the present invention is not limited to the following embodiments.

Embodiment 1

According to Embodiment 1, the configuration and the production method of the prism are explained by taking a triangular prism as an example of the prism. Further, the configuration of the optical device is explained by taking an imaging device as an example of the optical device.

Figure 1:
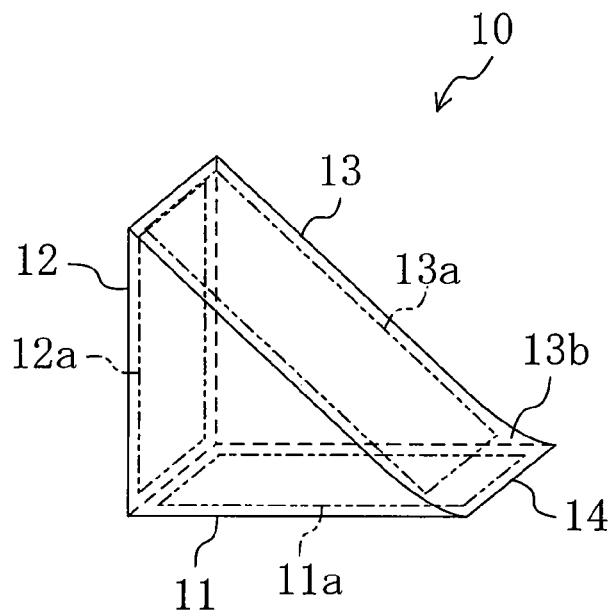
FIG. 1 is a perspective view illustrating a prism according to Embodiment 1.
Figure 2:
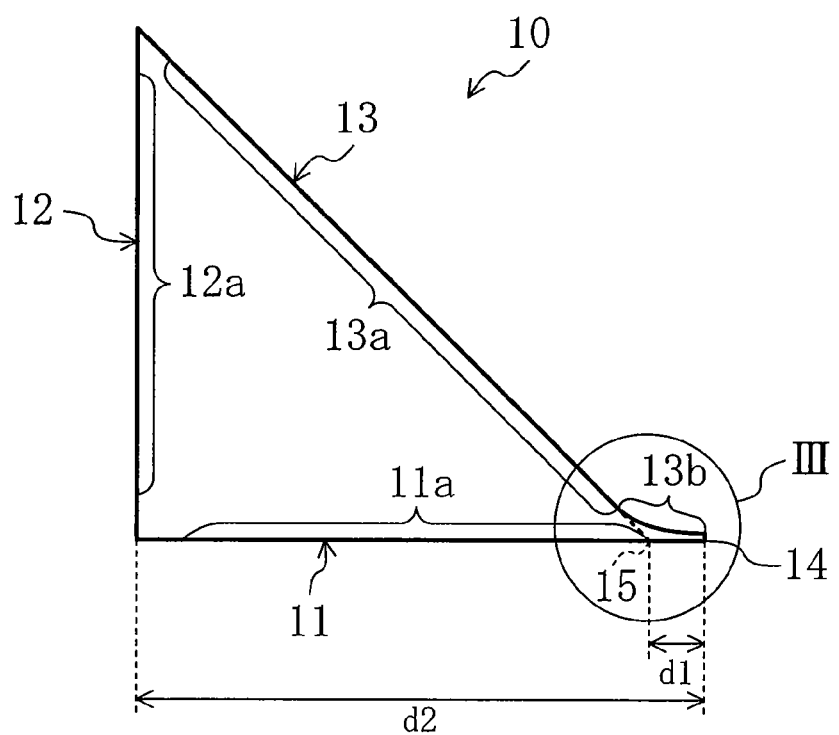
FIG. 2 is a cross sectional view of the prism according to Embodiment 1.
Figure 3:
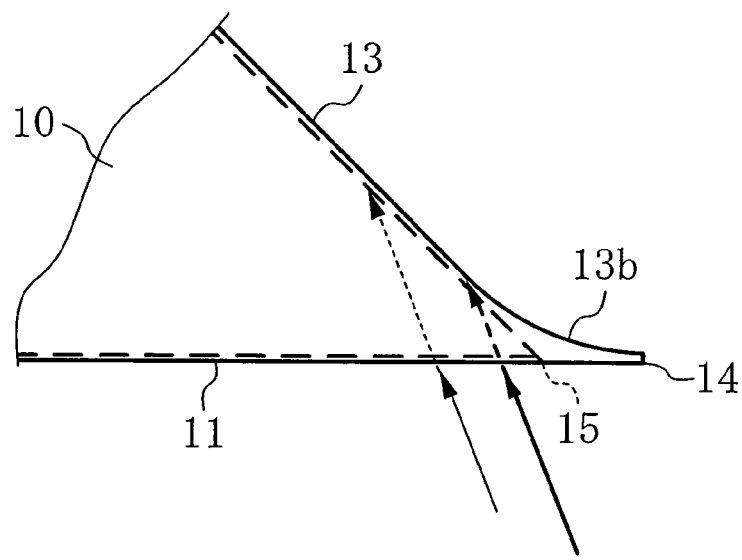
FIG. 3 is an enlarged view of a circled part III shown in FIG. 2.
Figure 4:
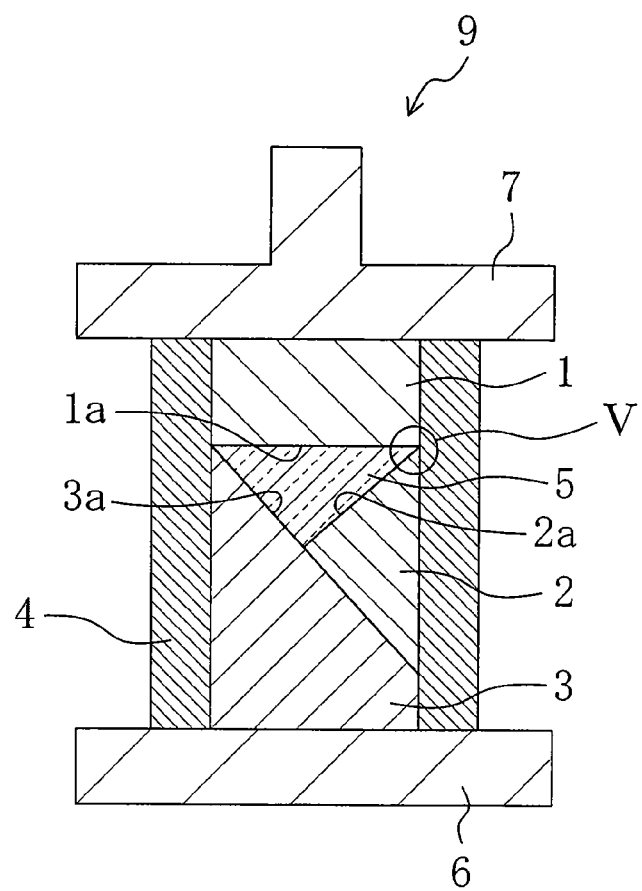
FIG. 4 is a sectional view illustrating a major part of a prism forming device.
Figure 5:
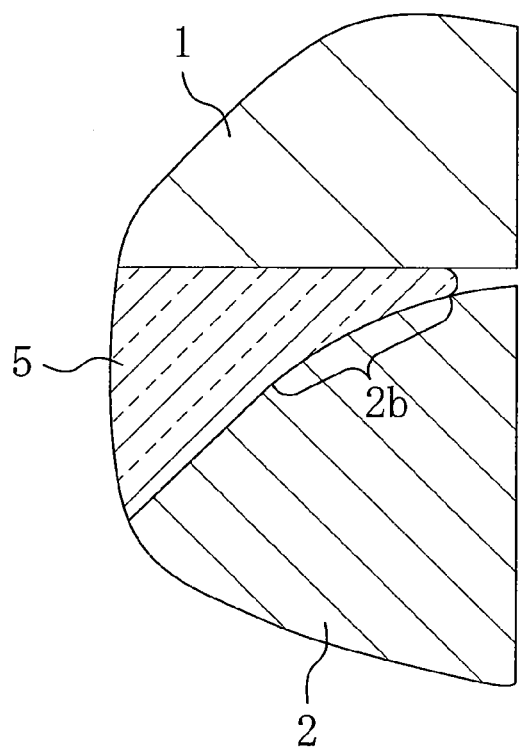
FIG. 5 is an enlarged view of a circled part V shown in FIG. 4.
Figure 6:
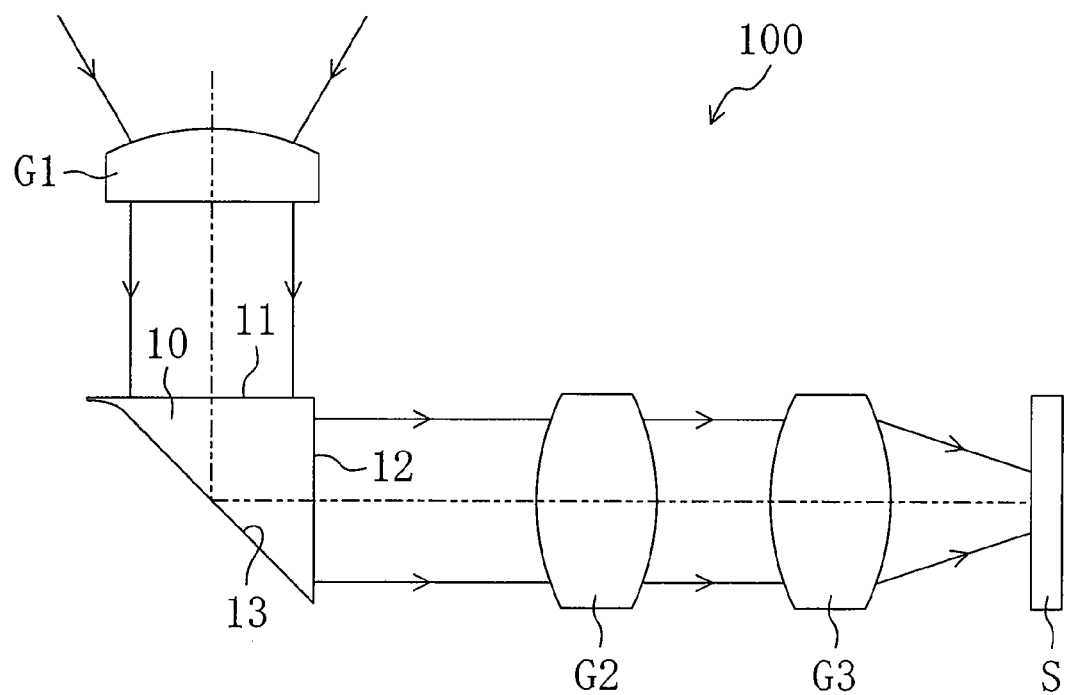
FIG. 6 is a diagram illustrating the configuration of an optical system in an imaging device.

In the present embodiment, the configuration and the production method of a prism 10 and an imaging device 100 are explained with reference to FIGS. 1 to 6. FIG. 1 is a perspective view illustrating the configuration of the prism 10. FIG. 2 is a cross sectional view of the prism 10. FIG. 3 is an enlarged view of a circled part III shown in FIG. 2. FIG. 4 is a sectional view of a major part of a device 1 for forming the prism 10. FIG. 5 is an enlarged view of a circled part V shown in FIG. 4. FIG. 6 is a view illustrating the configuration of an optical system in the imaging device 100.

First, the configuration of the prism 10 is explained with reference to FIGS. 1 to 3.

As shown in FIG. 1, the prism 10 is a substantially triangular prism made of glass having a refractive index of 1.65 or higher with respect to D line (an output wavelength of a sodium vapor lamp: 589.0 nm or 589.6 nm). The prism 10 has a first optical surface 11, a second optical surface 12 and a third optical surface 13 formed on different surfaces of the triangular prism. A light entrance region 11*a* is provided at the center of the first optical surface 11, a light exit region 12*a* is provided at the center of the second optical surface 12 and a light reflecting region 13*a* is provided at the center of the third optical surface 13. Accordingly, light enters the prism from the light entrance region 11*a*, is totally reflected substantially vertically on the light reflecting region 13*a* and then exits from the prism through the light exit region 12*a*. The light exit region may be provided at the center of the first optical surface 11 and the light entrance region may be provided at the center of the second optical surface 12. When the light is totally reflected, it means that the light is reflected with a reflectivity of 90% or higher, preferably 95% or higher, more preferably 97% or higher.

Referring to FIGS. 2 and 3, the configuration of an edge 14 of the prism between the first optical surface 11 and the third optical surface 13 and its vicinity is explained in detail. Suppose that there is a virtual surface between the light reflecting region 13*a* and the first optical surface 11 (indicated in FIG. 3 by a broken line along a hypotenuse of the prism), the virtual surface is positioned more inward in the prism than a peripheral region 13*b* extending from the light reflecting region 13*a* to the edge 14. Therefore, as shown in FIG. 3, a line of intersection 15 of the virtual surface and the first optical surface 11 is positioned more inward in the prism than the edge 14. Therefore, the first optical surface 11 is longer than a first optical surface of a conventional prism (outlined by broken lines) not provided with the peripheral region 13*b* by the distance from the line of intersection 15 to the edge 14. In general, an area of an optically effective region on the optical surface is proportional to the entire area of the optical surface. That is, the larger the area of the first optical surface 11 is, the larger the area of the light entrance region 11*a* is. Therefore, the area of the light entrance region 11*a* of the prism 10 is larger than the area of the light entrance region of the conventional prism. As a result, as shown in FIG. 3, the position indicated by a thin solid-line arrow is the outermost entrance position in the light entrance region of the conventional prism, whereas the position indicated by a thick solid-line arrow is the outermost entrance position in the light entrance region of the prism 10.

As shown in FIGS. 2 and 3, the peripheral region 13*b* is not in contact with the virtual surface and draws a gentle concave curve. Therefore, light, even if it enters the prism 10 from the outermost entrance position, travels within the prism 10 without running onto an inner wall surface of the peripheral region 13*b*, and then reflected on the light reflecting region 13*a*.

The prism 10 is provided with the peripheral region 13*b*. Distance d1 between the edge 14 and the line of intersection 15 (indicated in FIG. 2) is not greater than 10% of the length d2 of the first optical surface 11 (indicated in FIG. 2). Therefore, the size of the prism 10, even if it is provided with the peripheral region 13*b*, is substantially the same as that of the conventional prism.

If the ratio of d1 with respect to d2 is low, it is not preferable because the area of the light entrance region is not considerably increased as compared with that of the conventional prism. On the other hand, if the ratio of d1 to d2 is high, it is not preferable because the size of the prism itself becomes large as compared with that of the conventional prism. For this reason, d1 is set not greater than 10% of d2, preferably not greater than 5% of d2, more preferably not greater than 3% of d2.

Now, the production method for the prism 10 is described with reference to FIGS. 4 and 5.

First, a prism forming device 9 shown in FIG. 4 is prepared. To be more specific, a lower mold (pressing mold) 3 is placed in a tubular barrel (barrel mold) 4. The lower mold 3 is provided with a prism forming face 3*a* on one of the surfaces thereof. The lower mold 3 is placed in the barrel 4 so that the prism forming face 3*a* is oriented upward. Then, an intermediate mold (pressing mold) 2 is placed on the lower mold 3. The intermediate mold 2 is provided with a prism forming face 2*a* and a curved face 2*b* on one of the surfaces thereof. The intermediate mold 2 is placed in the barrel 4 so that the one of the surfaces does not come to contact with the inner wall of the barrel 4 and the lower mold 3 and that the curved face 2*b* comes close to the inner wall of the barrel 4. Accordingly, when viewed from the top of the barrel 4, one can see the prism forming face 2a and the curved face 2b of the intermediate mold 2 and the prism forming face 3a of the lower mold 3.

Then, a prism material 5 is prepared. To be more specific, it is glass having a refractive index of not lower than 1.65 with respect to D line. The shape thereof is not particularly limited. However, if it is shaped similarly to the finally obtained prism, thermal energy and heating time required in the heating process to be performed later are saved and as a result, the prism is molded while shrinkage or other defects are restrained to the maximum extent. For this reason, the prism material is preferably substantially in the form of a cylinder, more preferably substantially in the form of a triangular prism.

The thus prepared prism material 5 is placed in the barrel 4 of the prism forming device 9. Then, an upper mold (pressing mold) 1 is placed on the prism material 5. The upper mold 1 is provided with a prism forming face 1a on one of the surfaces thereof. The upper mold 1 is placed in the barrel 4 so that the prism forming face 1a is oriented downward. In this state, the prism forming faces 1a, 2a and 3a and the curved face 2b are in contact with the surfaces of the prism material 5.

Then, with an upper heater block 7 placed on the upper mold 1 and a lower heater block 6 placed below the lower mold 3, the prism material 5 is softened by heating up to a temperature around its softening point.

Pressure is applied to the upper mold 1 to pressurize the prism material 5 so that the shape of the prism forming face 1a of the upper mold 1 is transferred to the prism material 5. At the same time, the shapes of the prism forming face 2a and the curved face 2b of the intermediate mold 2 and the prism forming face 3a of the lower mold 3 are transferred to the prism material 5. As a result of the transfer of the shape of the curved face 2b to the prism material 5, a peripheral region 13b is formed.

Using the upper heater block 7 and the lower heater block 6, the prism material 5 is cooled down to a temperature around room temperature. In this cooling process, the prism material is preferably cooled slowly to a temperature slightly lower than the softening point of the glass and then quenched to a temperature around room temperature. In this way, the prism 10 is formed.

Hereinafter, the effects of the prism 10 of the present embodiment are summarized.

Since the prism 10 is provided with the light entrance region 11a which is larger in area than that of the conventional prism, a light beam of larger diameter is allowed to enter the prism. Therefore, when the prism 10 is installed in an imaging device, there is no need of reconstructing the optical system of the imaging device even if the aspect ratio of the imaging element is changed from 4:3 to 16:9. Further, since the size of the prism 10 is substantially unchanged from that of the conventional prism, the imaging device is reduced in size. In summary, the prism 10 makes it possible to receive a light beam of larger diameter without increasing the size of the imaging device.

Since the prism 10 is made of the abovementioned glass, visible light incoming the prism 10 is totally reflected on the light reflecting region 13a.

Now referring to FIG. 6, the configuration of an imaging device 100 is explained.

Examples of the imaging device 100 may be DSCs (digital still cameras), DVCs (digital video cameras), mobile phone cameras and projection televisions (televisions). Each of them includes a light receiving element such as an imaging element and an imaging optical system. The imaging optical system functions to project an optical image of a subject on a light receiving surface of the light receiving element. More specifically, the imaging optical system includes, as shown in FIG. 6, a first lens group G1, the prism 10, a second lens group G2 and a third lens group G3 sequentially arranged in the direction from the subject to the light receiving element S. The aspect ratio of the light receiving element S is 16:9.

According to the imaging device 100, light (mostly visible light) enters the first lens group GI from the subject side, and then enters the light entrance region 11a of the first optical surface 11 of the prism 10. The light entered through the light entrance region 11a is totally reflected substantially vertically on the light reflecting region 13a of the third optical surface 13 and exits from the light exit region 12a of the second optical surface 12. The visible light is an electromagnetic wave within a wavelength range which is perceived as light by human eyes. Through there are variations among individuals, it is an electromagnetic wave within the range between 360-400 nm and 760-830 nm, both inclusive. When the light is totally reflected, it means that the light is reflected with a reflectivity of 90% or higher, preferably 95% or higher, more preferably 97% or higher.

As described above, the imaging device 100 includes the prism 10. Therefore, different from the imaging device including the conventional prism, there is no need of adjusting the optical system in the device even if the light receiving area of the imaging element is increased. Further, since the size of the prism 10 itself is substantially unchanged from that of the conventional prism, the size of the imaging device 100 is substantially the same as that of the imaging device including the conventional prism.

Embodiment 2

Figure 7:
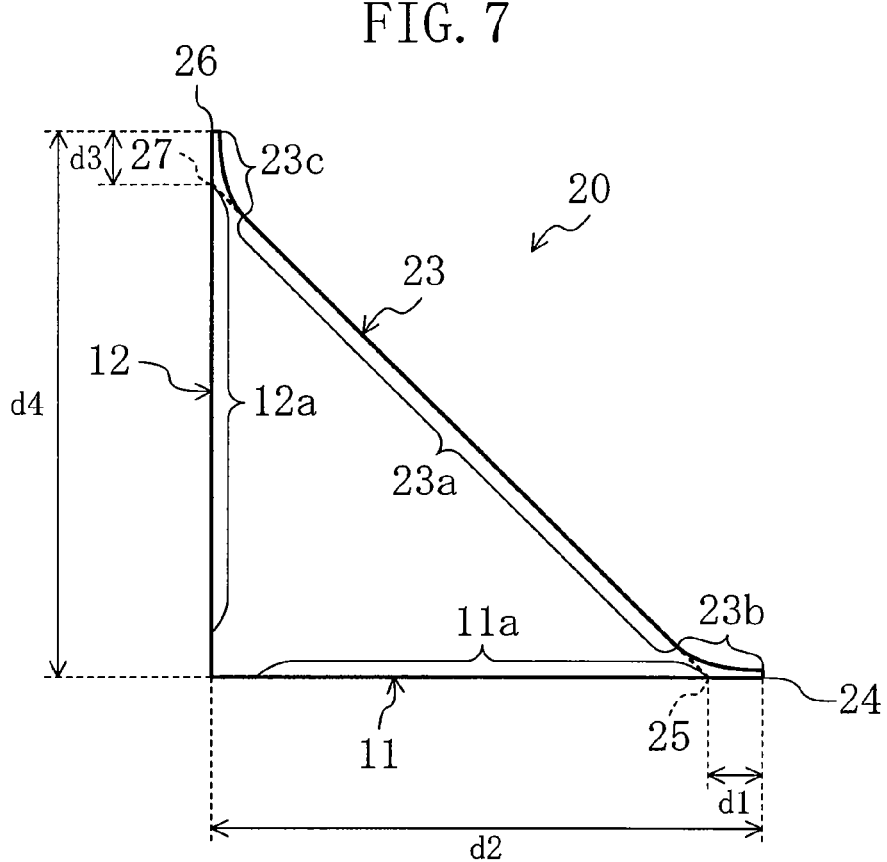
FIG. 7 is a cross sectional view of a prism according to Embodiment 2.

Referring to FIG. 7, the configuration of a prism 20 according to Embodiment 2 is described. FIG. 7 shows a cross section of the prism 20.

Unlike the prism 10 of Embodiment 1, the prism 20 shown in FIG. 7 is provided with a peripheral region 23b and a peripheral region 23c on a third optical surface 23. The peripheral region 23b extends from a light reflecting region 23a to an edge 24 between a first optical surface 11 and the third optical surface 23. It is configured substantially the same as the peripheral region 13b of Embodiment 1.

The peripheral region 23c extends from the light reflecting region 23a to an edge (second edge) 26 between a second optical surface 12 and the third optical surface 23. It is configured substantially the same as the peripheral region 13b of Embodiment 1. Now, the configuration of the edge 26 and its vicinity is briefly explained. Suppose that there is a virtual surface between the light reflecting region 23a and the second optical surface 12, the virtual surface is positioned more inward in the prism than the peripheral region 23c.

Therefore, as shown in FIG. 7, just like the case of the edge 24, a line of intersection (a second line of intersection) 27 of the virtual surface and the second optical surface 12 is positioned more inward in the prism than the edge 26. To be more specific, distance d3 between the edge 26 and the line of intersection 27 is not greater than 10% of the length d4 of the second optical surface. The relationship between d3 and d4 is substantially the same as that between d1 and d2 described in Embodiment 1.

As described above, the prism 20 offers substantially the same effect as the prism 10 of Embodiment 1. Further, with the additional provision of the peripheral region 23c, a light beam of larger diameter is allowed to enter the prism even if the light entrance region is provided at the center of the second optical surface 12.

For the production of the prism 20, a lower mold provided with a prism forming face and a curved face on the same surface thereof is preferably used.

Embodiment 3

In Embodiment 3, the configuration of the optical device is described by taking an illuminating device as an example.

Figure 8:
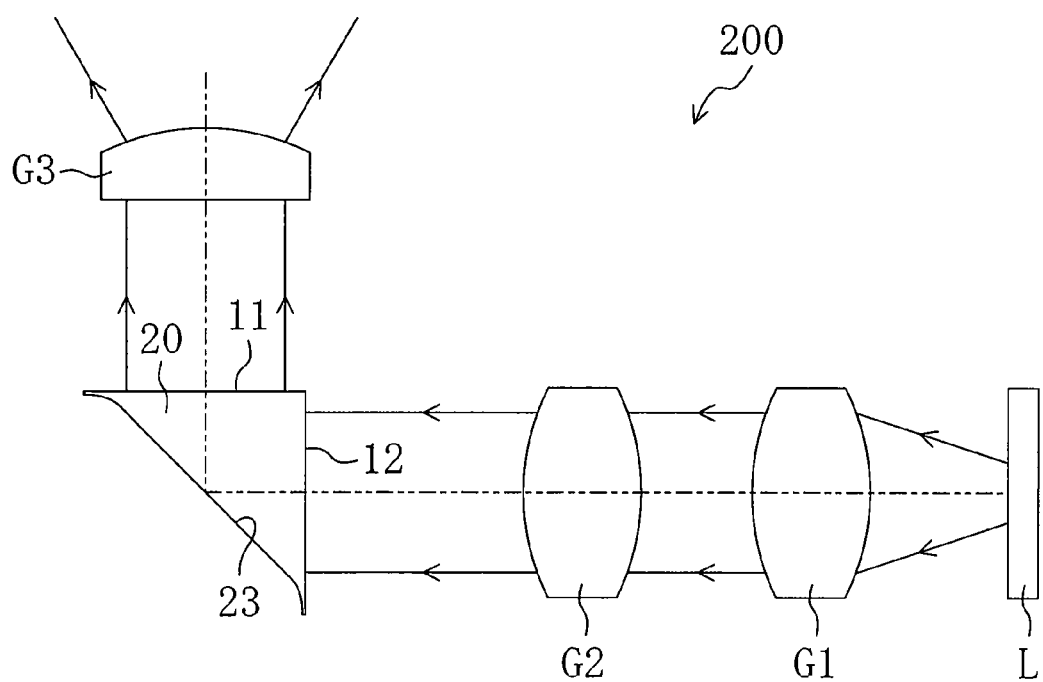
FIG. 8 is a diagram illustrating the configuration of an optical system in an illuminating device.

In the present embodiment, an illuminating device 200 including the prism 20 of Embodiment 2 is explained with reference to FIG. 8. FIG. 8 is a diagram illustrating the configuration of an optical system in the illuminating device 200. In FIG. 8, a dash-dot-dot line indicates an optical axis and arrows depict the traveling direction of light.

The illuminating device 200 may be a single-lens reflex camera including a light source and an illuminating optical system. The illuminating optical system functions to irradiate a subject with light emitted from the light source. To be more specific, as shown in FIG. 8, the illuminating optical system includes a first lens group G1, a second lens group G2, the prism 20 and a third lens group G3 sequentially arranged along the light traveling direction from the light source L. In the illuminating device 200, the prism 20 is configured so that a first optical surface 11 function as a light exit surface and a second optical surface 12 functions as a light entrance surface.

Light is emitted from the light source L, collimated by the first lens group G1 and passes through the second lens group G2, and then enters the light entrance region 12a of the second optical surface 12 of the prism 20. The light entered the light entrance region 12a is totally reflected and bent substantially vertically on the light reflecting region 23a of the third optical surface 23, and then exits from the light exit region 11a of the first optical surface 11. The light exited from the light exit region 11a passes through the third lens group G3 and emitted out of the illuminating device 200.

The illuminating device 200 includes the prism 20 of Embodiment 2. The prism 20 is able to receive a light beam of larger diameter as compared with the conventional prism. Therefore, the illuminating device 200 is excellent in illumination intensity as compared with an illuminating device including the conventional prism.

The size of the prism 20 itself is substantially the same as that of the conventional prism. Therefore, the size of the illuminating device 200 is substantially unchanged from that of the illuminating device including the conventional prism.

Other Embodiments

In Embodiments 1 to 3, the triangular prism is used as an example of the prism. However, the prism is not limited to the triangular prism and any other polygonal prisms may be used.

The prisms according to Embodiments 1 to 3 preferably include anti-reflection films formed on the first and second optical surfaces. With the provision of the anti-reflection films, the light is allowed to enter the prism almost without being reflected on the light entrance region of the first optical surface and the light is allowed to exit from the second optical surface almost without being reflected on the light exit region of the second optical surface.

The prism of Embodiment 1 is provided with only a single peripheral region, whereas the prism of Embodiment 2 is provided with the peripheral region and additional peripheral region. However, the prism may be provided with only the additional peripheral region. If the additional peripheral region is provided, the prism can be installed in the illuminating device of Embodiment 3.

More specifically, the prisms according to Embodiments 1 and 2 may preferably be formed by the following method.

The upper mold is prepared so that the prism forming face has a wave aberration of not higher than $\lambda/10$, while the intermediate and lower molds are prepared so that their prism forming faces have a wave aberration of not higher than $\lambda/4$. As the prism material, used is a cylindrical material having a mirror-finished side surface (K-VC78 (nd: 1.66910, Tg: 520° C., At: 556° C.) manufactured by Sumita Optical Glass, Inc.). Symbol $\lambda$ indicates a wavelength of light emitted from a He—Ne laser.

Then, the prism material is sandwiched between the intermediate mold, the lower mold and the upper mold and placed in the barrel. Then, the temperature is raised up to a temperature around 570° C. in 20 minutes. The upper mold is then pressed downward to apply a pressure of 2 KN to the softened prism material so that the shape of the prism forming face of the upper mold is transferred to the surface of the prism material.

Subsequently, a heating part of the lower heater block is slowly cooled down to a temperature around 510° C. in 8 minutes, a heating part of the upper heater block is slowly cooled down to a temperature around 510° C. in 12 minutes, and then the heating parts of the upper and lower heater blocks are quenched to room temperature in 13 minutes.

The molds are removed from the barrel of the prism forming device and disassembled to take the prism out. In this manner, a triangular prism having a bottom surface substantially in the form of a rectangular equilateral triangle is obtained (equilateral sides are 10 mm long, respectively, a hypotenuse is 14 mm long and a prism height is 15 mm). The light reflecting region of the obtained prism has a wave aberration of not higher than $\lambda/10$ and the light entrance region and the light exit region have a wave aberration of not higher than $\lambda/4$.

Industrial Applicability

As described above, the present invention is useful for prisms and optical devices including the prisms.

The invention claimed is:

1. A polygonal prism having a first optical surface, a second optical surface and a third optical surface formed on different surfaces of the prism, wherein:
    a light entrance region is provided at the center of the first optical surface,
    a light exit region is provided at the center of the second optical surface,
    a substantially flat light reflecting region is provided at the center of the third optical surface,
    a first plane located between the light reflecting region and the first optical surface, the first plane is positioned more inward in the prism than a peripheral region of the third optical surface extending from the light reflecting region to an edge between the third optical surface and the first optical surface, and
    the peripheral region of the third optical surface extending from the light reflecting region to the edge between the third optical surface and the first optical surface has a curved surface.

2. The prism of claim 1, wherein in a cross section of the prism, a distance from a line of intersection of the first plane and the first optical surface to the edge is not greater than 10% of the length of the first optical surface.

3. The prism of claim 1, wherein a second plane located between the light reflecting region and the second optical surface is positioned more inward in the prism than a peripheral region of the third optical surface extending from the light reflecting region to a second edge between the third optical surface and the second optical surface, and in a cross section of the prism, a distance from a second line of intersection of the second plane and the second optical surface to the second edge is not greater than 10% of the length of the second optical surface.

4. The prism of claim 1, wherein visible light which entered the prism from the light entrance region is totally reflected on the light reflecting region.

5. The prism of claim 1, wherein the prism is made of glass having a refractive index of not lower than 1.65 with respect to D line.

6. An optical device including an optical system having a polygonal prism having a first optical surface, a second optical surface and a third optical surface formed on different surfaces of the prism, wherein:

a light entrance region is provided at the center of the first optical surface, a light exit region is provided at the center of the second optical surface, a substantially flat light reflecting region is provided at the center of the third optical surface, a first plane located between the light reflecting region and the first optical surface, the first plane is positioned more inward in the prism than a peripheral region of the third optical surface extending from the light reflecting region to an edge between the third optical surface and the first optical surface, and the peripheral region of the third optical surface extending from the light reflecting region to the edge between the third optical surface and the first optical surface has a curved surface.

7. The optical device of claim 6, wherein in a cross section of the prism, a distance from a line of intersection of the first plane and the first optical surface to the edge is not greater than 10% of the length of the first optical surface.

8. The optical device of claim 6, further comprising:

a light receiving element, and an imaging optical system for generating an optical image of a subject on a light receiving surface of the light receiving element, wherein the prism is arranged in an optical path of the imaging optical system.

9. The optical device of claim 6, further comprising;

a light source, and an illuminating optical system for irradiating a subject with light emitted from the light source, wherein the prism is arranged in an optical path of the illuminating optical system.

* * * * *